United States Patent [19]

Giel

[11] 4,404,504

[45] Sep. 13, 1983

[54] HIGH-EFFICIENCY, LOW-SPEED ELECTRIC MOTOR SYSTEM

[75] Inventor: George J. Giel, Los Angeles, Calif.

[73] Assignee: Leland R. Rowsell, Los Angeles, Calif.

[21] Appl. No.: 245,372

[22] Filed: Mar. 19, 1981

[51] Int. Cl.$^3$ .............................................. H02K 29/00
[52] U.S. Cl. .................................. 318/269; 310/40 R
[58] Field of Search ............. 310/40 R, 40 MM, 40.5; 318/382, 269

[56] References Cited

U.S. PATENT DOCUMENTS

| | | | |
|---|---|---|---|
| 3,271,649 | 9/1966 | Juergensen | 318/269 X |
| 3,427,898 | 2/1969 | Mayer | 310/40 R UX |
| 3,593,085 | 7/1971 | Decker, Jr. | 318/382 X |
| 3,832,613 | 8/1974 | Bernstein et al. | 318/269 |

Primary Examiner—J. V. Truhe
Assistant Examiner—W. E. Duncanson, Jr.
Attorney, Agent, or Firm—Poms, Smith, Lande & Rose

[57] ABSTRACT

An inherently low speed, high torque, high reliability electric motor features a simple design which is inherently amenable to simple electronic control and utilizes only elements of moderate precision. An electrical circuit distributes electric current successively to a multiplicity of circularly arrayed electromagnets to provide sequentially existing magnetic fields, which progresses around the circular array of electromagnets. The sequential fields attract successive circumferentially distributed portions of a rigid cylindrical shell or drum of ferromagnetic material. Successive portions around the periphery of the shell are pulled into engagement with the circular array of electromagnets. This action produces combined oscillation and rotation of the axis of rotation of the shell, which may be referred to as "nutation" thereof, and this movement is converted into the pure rotation of an output shaft by means of either (1) two pairs of concentric gears featuring mating interfaces of differing circumference, or (2) a flexible coupling which connects a shaft which is on the geometric center of the nutating magnetic drum to a shaft which rotates on fixed bearings. The circuitry includes means for full locked stopping, varying the speed and reversing the direction of rotation of the output shaft by altering the sequence of energization of the electromagnets.

14 Claims, 11 Drawing Figures

HIGH-EFFICIENCY, LOW-SPEED ELECTRIC MOTOR SYSTEM

BACKGROUND OF THE INVENTION

The present invention relates to electric motors. In particular, it relates to DC motors of the type which are especially adapted to produce a relatively low speed, high torque rotation of a shaft, at relatively high levels of efficiency.

It is well known that the most efficient conventional direct current (DC) electric motors are inherently high speed. In addition, such DC motors, which usually feature moving conductors in a stationary magnetic field, are limited in terms of output torque by the minimum air gap which can be maintained between the poles of the magnets and the moving conductor, all else being equal. The conventional expression for the force on a conductor (the torque in a motor) is $F = k\ BI$ (where B is the magnetic field intensity and I is the current through the conductor). Since the magnitude of the magnetic field follows the immutable physical "inverse square law", increasing the airgap disproportionately decreases the force or torque. For example, doubling the length of the air gap reduces the magnetic flux and the resulting force by a factor of four. Therefore, in conventional motor design the air gap is held to a minimum. Unfortunately, other engineering factors, such as the accumulation of mechanical tolerances, air drag losses between closely spaced moving surfaces, concomitant cost factors, and the like, force air gaps of 0.03 inches to greater than 0.10 inch.

Many electric motor usages, such as ventilation fans, blowers, vacuum cleaners, etc. function well at high rotational speeds. There exists, however, a significant number of important applications of electric motors which require relatively low speed and high torque. Some of these applications include motors for electrical powered vehicles, machine tools, electric chain saws, clothes dryers, pumps, large weapon controls, conveyor belts, paper feeds for office machines, battery-operated handtools and many others. Conventional electric motors do not efficiently operate at the low rotational speeds necessary in the above cited examples.

To solve this problem, designers commonly gear down high speed motor outputs to their eventual, low speed-high torque intended mechanical usage. Unfortunately, each gear (or equivalent belting combination) has a finite efficiency (and concomitant cost) so that the overall efficiency of the system is cumulatively degraded. As an example, a golf cart going 10 mph with driving wheels which are two feet in diameter requires a wheel speed of 140 rpm. If one were to utilize a 12,000 rpm motor, a speed reduction of about 86:1 would be necessary. Practical gear reductions are limited to about 8:1. Thus, it would require at least three sets of gears, shafts, bearings, etc. to achieve the desired speed reduction. The result is high expense (gearing often must be precision-machined), inherent motor and gear whine, and the multiplicity of parts which greatly reduces reliability and complicates maintenance.

SUMMARY OF THE INVENTION

The present invention overcomes the difficulties encountered in the application of electromechanical power to the large number of tasks which require relatively low speed and high torque and substantial power levels by providing an inherently low speed, high torque motor therefor. The motor is of a simple design which features relatively few moving parts, none of which requires high precision manufacture or complex maintenance. It includes a movable rigid cylindrical body of ferromagnetic material which forms the "rotor" of the motor. A number of electromagnets are circularly arrayed, their arrangement corresponding generally to the circumference of the cylindrical rotor so that each, when energized, exerts sufficient attractive force to urge a portion of the cylinder into intimate contact with the pole pieces of the individual electromagnets.

The pole pieces of the electromagnets are spaced around a cylindrical contact zone extending substantially parallel to the cylindrical "rotor". As a result, the pole pieces of the electromagnets when energized, successively engage the rotor around its periphery to form substantially closed paths of magnetic flux, and cause the cylindrical "rotor" to roll around the surface of the cylindrical contact zone to which the electromagnetic pole pieces extend. There closed, low reluctance paths of flux greatly enhance the efficiency of the motor.

An electrical circuit selectively and successively energizes each of the electromagnets. A shaft is provided to serve as the output of the motor. Means are provided for translating the aforesaid attractive magnetic forces and resultant rolling action of the cylindrical rotor into relatively low speed rotation of said shaft.

Additional preferred features of the invention include (1) the use of an inner "stator" including the electromagnets, and an outer rigid cylindrical "rotor"; (2) the use of a limited number of electromagnets, such as four, six or eight, for example: (3) the use of inner and outer gear teeth at the two ends of the rotor and stator to insure traction as the rotor "rolls around" the stator; (4) the use of a flexible coupling to drive the output shaft from the relatively slowly nutating cylindrical rotor; and (5) ease in controlling the speed, direction of rotation, and braking of the motor.

A principal advantage of the invention is the increased efficiency and reduced losses for low speed electrical motor applications; and a collateral advantage is the ease in control of the motor as noted in item (5) of the preceding paragraph.

These and other advantages and features of the present invention are described in and will become apparent from the following detailed description in which like numerals represent like parts throughout:

BRIEF DESCRIPTION OF THE DRAWINGS

FIG. 7 is an exploded view of another motor illustrating the principles of the invention;

FIG. 8 is a diagrammatic showing indicating one possible type of mechanical switching arrangements which may be employed;

DETAILED DESCRIPTION

Figure 1A:
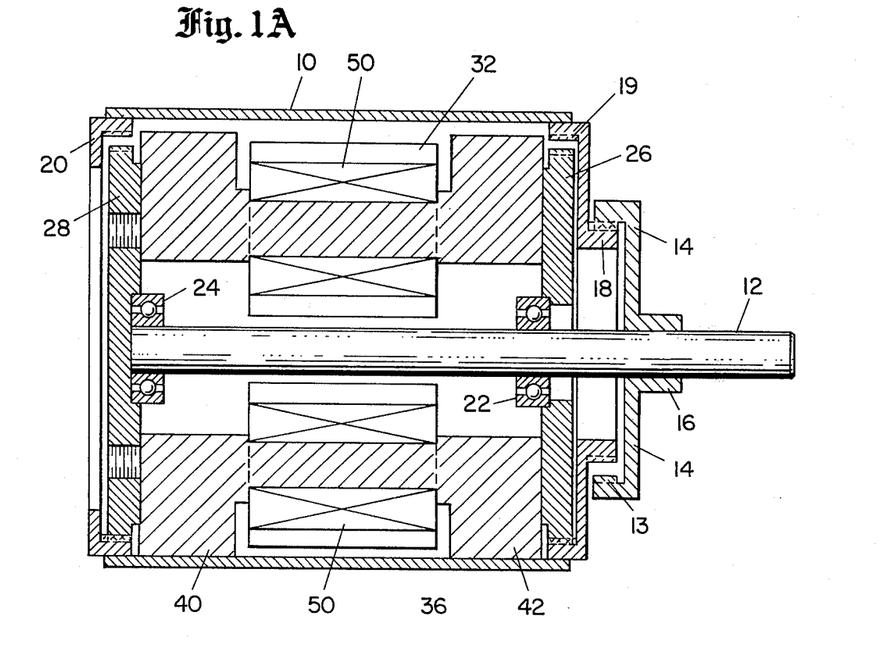
FIGS. 1A and 1B are, respectively, side and cross-sectional views of one preferred embodiment of an electric motor according to the present invention.
Figure 1B:
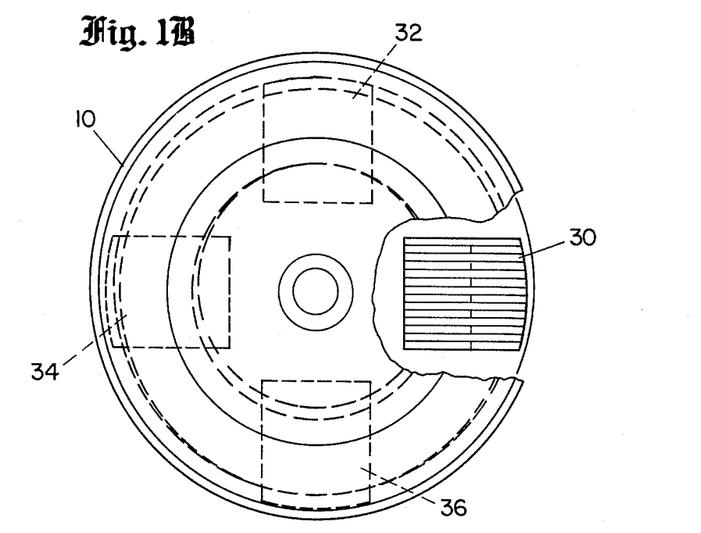

Turning now to the drawings, there are presented in FIGS. 1A and 1B side and cross-sectional views of the present invention according to a first preferred embodiment. Later it will be seen that this embodiment may be characterized as an "outer shell" motor as contrasted with an alternative embodiment illustrated in FIG. 6.

The motor features a nutating drum or shell 10 which is driven by the sequential energization of successive electromagnets located around the periphery of a circularly-arrayed plurality of electromagnets. Generally, the ferromagnetic shell 10 may be considered to be the rotor, in terms generally corresponding to a conventional electric motor, while the circular array of electromagnets is the stator.

The axis of the cylindrical shell 10 is parallel to that of an output shaft 12. In operation, the axis of the shell 10 in fact rotates about the fixed axis of the output shaft 12. The movement of the shell 10 serves to impart rotation indirectly to the output shaft 12 through the interaction of the internal teeth 13 of a transmission gear disc 14, mounted to a hub 16 affixed to the shaft 12, with the external teeth of an annular gear member 18. The gear 18 is affixed to the end of the shell 10, and its gear teeth extend outwardly to engage the inwardly directed teeth 13 of output gear disc 14. There is a lesser number of teeth on the gear 18 than there are teeth 13 on gear disc 14, and accordingly, the rotation of the output shaft 12 will be somewhat less than of cylinder 10. As an alternative to the aforesaid engagement, the shaft 12 may be driven by means of a ring gear fixed to the shell 10 which engages an output gear fixed to the shell 10 which would engage an output gear fixed directly to the output shaft 12. This would produce slightly increased rotation of the shaft 12 relative to cylinder 10. As a further alternative, the output shaft 12 may be coupled by a flexible member to the shell 10, thereby allowing for its nutation; and the rotation of the shaft 12 and cylinder 10 would then be the same.

The shaft 12 is journaled on a pair of low speed output bearings 22, 24. The bearings 22, 24 are of moderate precision of manufacture as opposed to the high precision required of high speed bearings. In addition, due to the inherently low speed of the motor, only limited lubrication is required for the bearings throughout their useful lives.

The rotation or "nutation" of the cylinder 10 is controlled by the interaction of the two pairs of gear teeth 19,26, and 20,28. More specifically, external teeth of a pair of stationary gear discs 26, 28 are mated to the internal teeth of the annular gears 19, 20. The nutation of the shell 10 is caused by the sequential energization of the circularly arrayed electromagnets 30, 32, 34, 36 exerting an attractive force upon successive portions of the shell 10 around its periphery, with the mating gears causing a rolling action of the outer pair of gears 19,20 on the inner gears 26,28. The engagement of the gears is characterized by the intentionally mismatched gear diameters. In particular, there are a greater number of teeth on the mating portions of the annular gears 19, 20, than on the stationary gear discs 26,28. A mismatch of the same sort also exists in the mating of the internal teeth of the transmission disc 14 and the external teeth of the inner circumference of the annular gear 18. From FIGS. 1B and 3 one can observe that the mismatch in gear diameters allows the substantial circumferential coincidence and consequent meshing of a portion of the teeth of the gears at the same time that the teeth of the diametrically opposed portion clear one-another.

The meshing or engagement of a circumferential portion of the teeth of the stationary gear discs 26, 28 with those of the annular gear pieces 19, 20 results from the energization of one of the (stationary) electromagnets 30, 32, 34 or 36. Although four such electromagnets are illustrated in FIG. 1B, nutation of the shell 10 can be positively generated by a minimum of three such electromagnets. On the other hand, by employing a greater number of electromagnets, one may increase the magnetic force and the consistency of torque of the motor by minimizing the air gap between the "present" and "next" electromagnet and give smoother operation.

Figures 2, 3, 6:
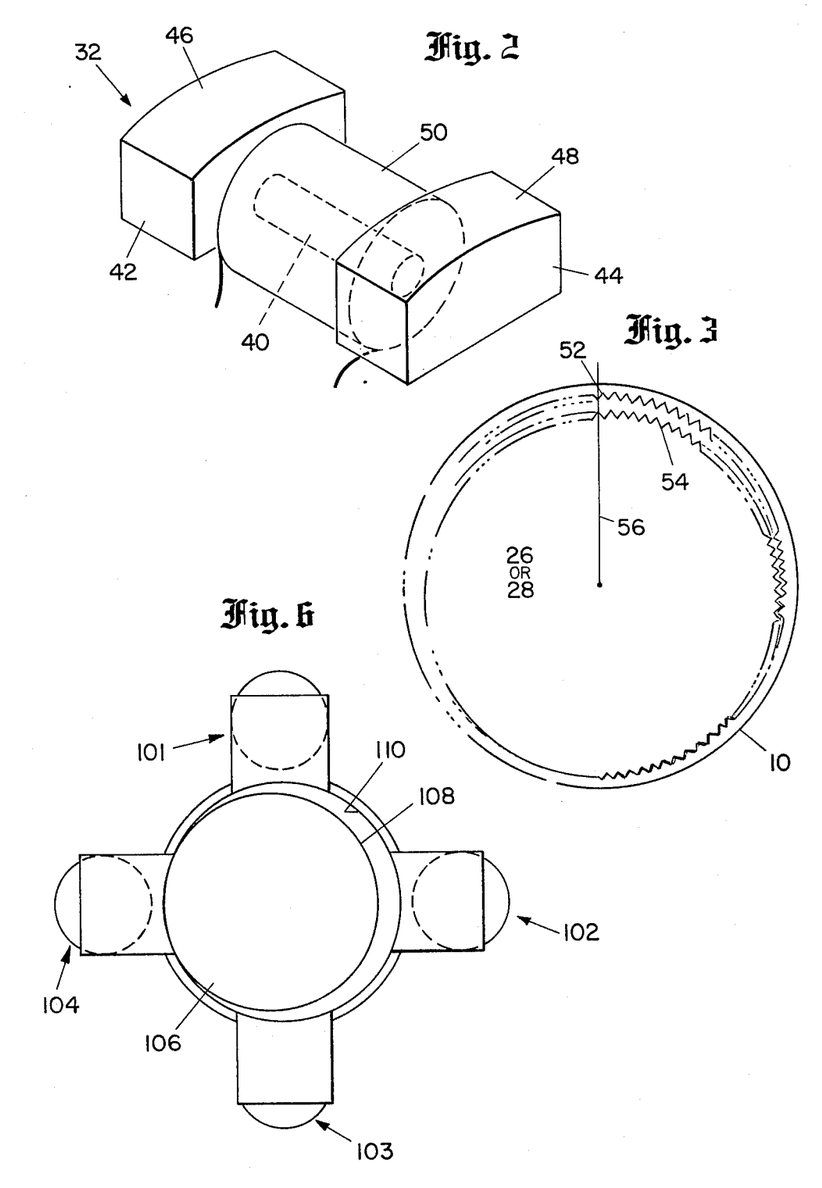
FIG. 2 is a perspective view of an electromagnet for use in the assembly of FIGS. 1A and 1B. The convexity of the faces of its pole pieces aids the efficient conversion of energy by allowing substantially flush engagement with the shell and, as a result, produces substantially closed lines of magnetic flux.
FIG. 3 is a schematic showing of the interaction of the gear teeth attached to the outer shell with a stationary gear for the purpose of illustrating the manner in which the shell is caused to nutate in response to the attractive forces of the array of electromagnets.
FIG. 6 is an axial view of another illustrative electric motor illustrating the principles of the invention.
Figure 2:
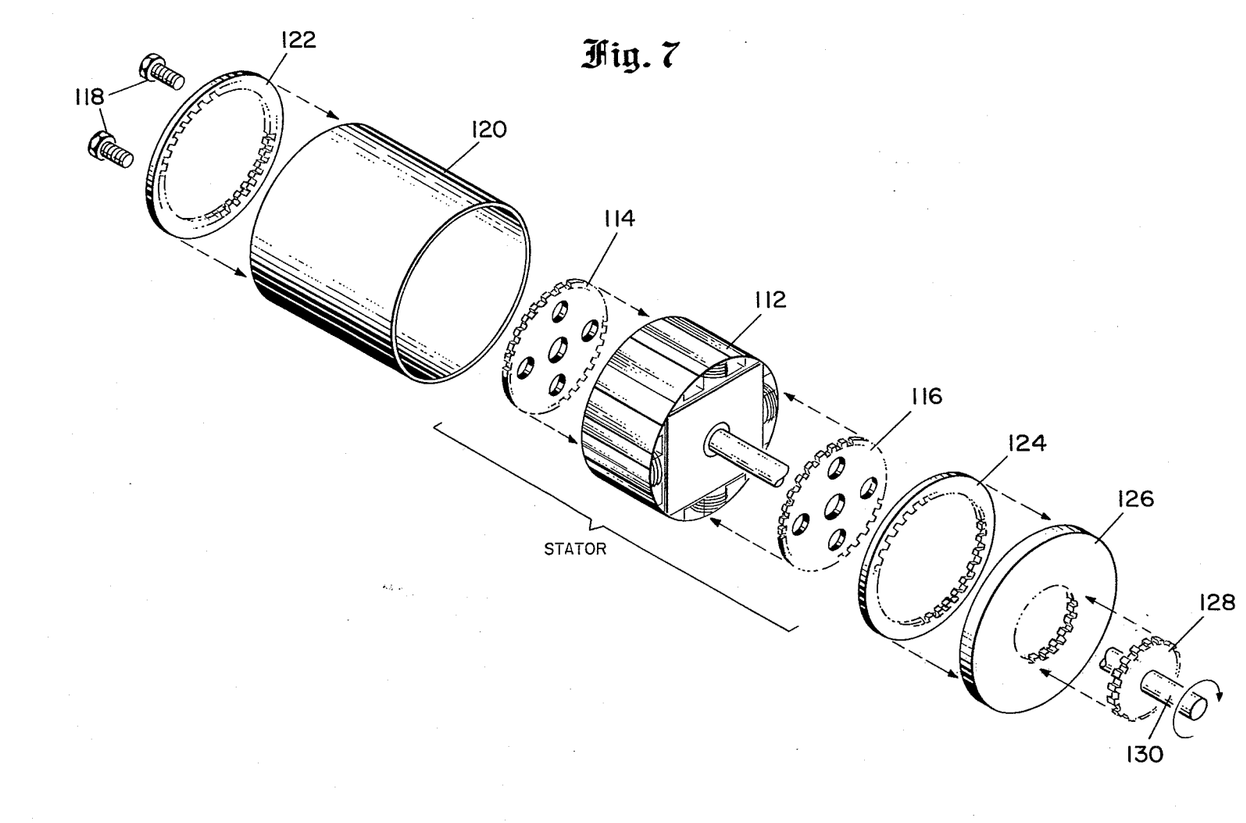

FIG. 2 shows an electromagnet 32 designed for use in a motor according to the embodiment of the invention of FIGS. 1A and 1B. It includes a core 40 of high magnetic permeability. The core 40 may be either a soft iron or it may consist of a plurality of laminated, soft iron sections. Opposed pole pieces 42, 44 are designed to provide substantially flush engagement with the ferromagnetic shell 10, when attracted, by means of the convex pole faces 46, 48. Each electromagnet is energized by means of a simple coil 50, in contrast to the complex field coils, wave windings and the like commonly found in present-day electric motors.

Figure 4:
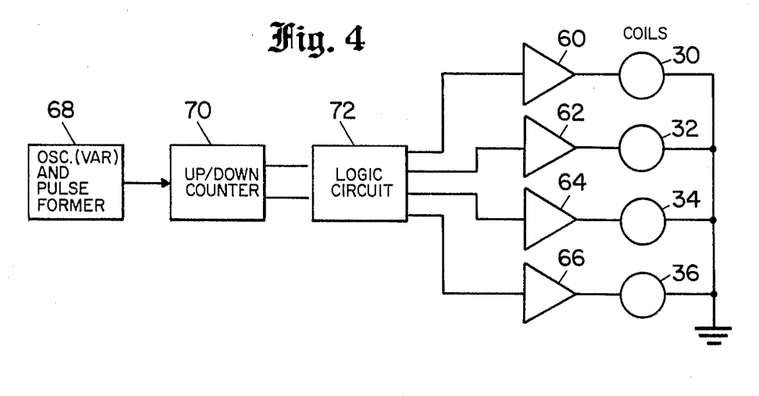
FIG. 4 is a functional block diagram of the electronic controls for the motor.

As described below, a number of modes or sequences, of energization, may be selectively employed by means of the electronic control circuitry disclosed in FIGS. 4 and 5. Each particular mode implements a useful mechanical action of the motor so that variable output speed, clockwise or counter-clockwise rotation, braking, locking, and stepping motor operation may all be achieved by the disclosed invention. Although a two-pole electromagnet is illustrated in FIG. 2, electromagnets utilizing three or more poles may be equivalently employed provided that their geometries are such that all poles of any one of the electromagnets may simultaneously attain relatively flush engagement with the shell 10 at the same time. It is an important feature and substantial advantage of the present invention that high torque output is achieved as a result of the efficient conversion of electrical energy into mechanical energy by the substantially flush interengagement of each of the energized electromagnet pole pieces with the shell 10. This engagement maximizes force by producing greatly reduced air gap between any energized electromagnet and the shell 10, (as compared with conventional motors), and, hence, a substantially continuous flux path extending almost entirely through material of high magnetic permeability.

FIG. 3 is a schematic showing of the interengagement or "meshing" of the internal teeth 52 of either of the annular gear pieces 19 or 20 with the external teeth 54 of the corresponding stationary gear disc 26 or 28. In the figure it is assumed that the teeth at the "bottom" of the circumference have been urged into engagement by the energization of the electromagnet located at the bottom of the circular array interior thereof. By such energization, the shell 10, to which the gears 19 and 20 are attached, is urged upward, meshing the teeth of its associated annular gear with the outwardly extending teeth at the bottom of the stationary gear 26. As shown in FIG. 3, a progressively larger separation of gear teeth occurs as one progresses from the bottom. This is due to the fact that (1) the other, de-energized, electromagnets of the circular array exert no attractive force on other portions of the circumference of the shell 10 and (2) the diameters of the gears differ. As one continues around the gears, a maximum separation is found along the radius 56 which is opposite from the lower zone of the gear circumference where the gears are meshing.

The slow nutation of the shell 10 results from the translation of the inward forces exerted upon successive portions of the gear circumference (by the magnetic fields developed by the sequential energization of the electromagnets around the periphery of shell 10) into tangential forces by means of the gears as shown in FIG. 3. The interior and exterior teeth of the gears prevent the return of the shell 10 to "center", a condition of no rotation, upon the completion of an energization cycle as defined above. They thus preserve the increment of either clockwise or counterclockwise movement which occurs during the energization cycle. For example, following one complete cycle with all four of the electromagnets having been sequentially energized, and the shell 10 having been attracted to and essentially rolling around the stator made up of the electromagnets, the teeth of the shell are displaced by an amount equal to the difference in the number of teeth of the linking gears, and are not returned to their original position. By choosing a given mismatch in the number of teeth, one can achieve a controllable rate of rotation (nutation) of the shell 10 in relation to the rate of sequential energization of the magnetic fields about the circumference of the shell 10. For example, if one were to mate a stationary gear having ninety-nine exterior gear teeth with an annular gear having one hundred interior gear teeth, an angular displacement of one tooth or 3.6 degrees would occur during each energizing cycle of the electromagnets. One hundred energizing cycles would be required for a complete 360 degree nutation of the shell 10. Thus, an inherent motor speed which is one hundred times less than the rate of sequencing of the magnets may be achieved by the present invention.

The above-described movement of the outer shell 10, induced by the successive attractions of successive circumferential portions thereof is, of course, transmitted to the external teeth of the gear 18 (see FIG. 1A). The nutation thereof is applied to the internal gear teeth 13 of the transmission gear disc 14. The transmission disc 14, rigidly affixed to the hub 16, thereby drives the output shaft 12 at the desired relatively slow rotational speed as determined by the rate of sequential energization of the electromagnets, and the ratios of the teeth in gears 19 and 26, and of gears 13 and 18.

The motor of the present invention may be energized in any suitable manner, with the electromagnets 30, 32, 34 and 36 being energized sequentially during normal operation, and with the sequential energization of the electromagnets being either clockwise or counterclockwise in order to operate the motor either in one direction or in the opposite direction. With reference to the block diagram of FIG. 4, the coils 30, 32, 34 and 36 are indicated by the circles toward the right of the block diagram, and they are energized by the power amplifiers 60, 62, 64, and 66, respectively. The control circuitry includes the variable frequency pulse generator or oscillator 68, the up/down binary counter 70, which may be operated either in one direction or the other, and the logic circuit 72 which converts the signals from the up-down counter 70 into signals applied to a single one of the four power amplifiers 60, 62, 64 and 66.

Figure 5:
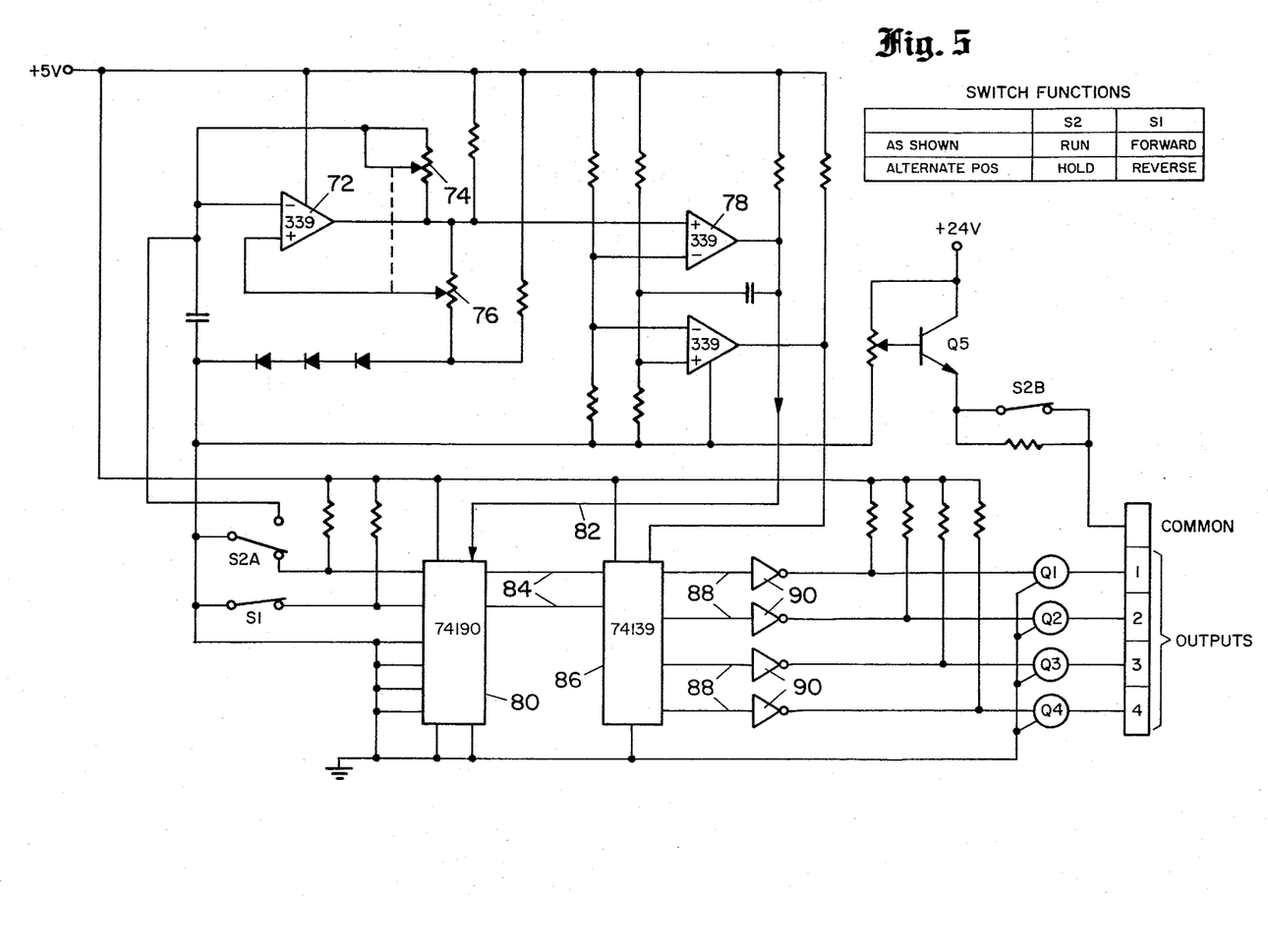
FIG. 5 is a logic circuit diagram of an illustrative electronic control circuit for a four electromagnet motor.

One illustrative implementation for driving the motor, and energizing the electromagnets as desired is shown in FIG. 5. In FIG. 5, a ramp base oscillator is implemented by the operational amplifier 72, with the frequency of the oscillator being variable from about 2 hertz, or 2 cycles per second, up to about 4,000 hertz by the potentiometers 74 and 76. The pulse output from the oscillator is supplied to the operational amplifier 78 and routed to the up/down counter 80 on lead 82. The counter 80 is a four-state binary counter with its output signals appearing on the two leads 84. The switch S-1 determines whether the counter counts in the "up" direction or in the "down" direction, and therefore determines the direction of rotation of the motor. Circuit 86 is a decoder, and energizes one and only one of the four output leads 88 in accordance with the binary signals supplied to the two leads 84. The inverters 90 control the power switches designed Q1, Q2, Q3 and Q4, providing sequential energization of outputs 1 through 4 to the four electromagnets, of FIG. 1, for example. When switch S2 is in the indicated position in FIG. 5, the motor is energized to rotate, either in the forward or reverse direction in accordance with switch S1. On the other hand, if the mechanically coupled switches S2A and S2B are in their alternate positions (not as shown in FIG. 5), then the motor is stopped, with a single one of the electromagnets being energized, and the rotor is held in a locked position. The components shown in FIG. 5 are generally conventional, with the part numbers appearing on the operational amplifiers and the counter and the decoder, and are available from a number of manufacturers under the indicated code numbers.

FIG. 6 shows an alternative motor arrangement with four electromagnets 101 through 104 being located peripherally outside the cylindrical magnetic rotor 106. Each of the electromagnets 101 through 104 may be of a configuration similar to the electromagnets shown in FIG. 2, but with the end pole pieces having a concave configuration, rather than the convex configuration as shown in FIG. 2. In addition, the outer surface 108 of the magnetic cylinder 106 may either be provided with a pair of gears of the type shown in FIG. 1, or may be made of frictional material to insure rolling engagement with the inner surface 110 with which the pole pieces of the electromagnets are coincident.

FIG. 7 shows an alternative arrangement of the invention which is similar in many respects to that shown in FIGS. 1A and 1B of the drawings. More specifically, the motor of FIG. 7 includes a stator structure 112 on which four E-shaped electromagnets are mounted, and to which two gears 114 and 116 are secured. Each of the four electromagnets may have an E-shaped magnetic structure with the coil on the center leg of the "E", and the ends of the pole pieces are curved to coincide and partially form the cylindrical outer surface of the stator. Mounting screws 118 are provided to secure the stator to a rigid base plate through brackets or the like which are not shown.

The rotor includes the magnetic cylinder 120 to which the two ring gears 122 and 124 are secured. These ring gears 122 and 124 are provided with gear teeth similar to those described in connection with FIG. 1A and FIG. 3, and mesh with the external gears 114 and 116 which are secured to the stator. Also secured to the magnetic cylinder 120 is the smaller ring gear 126, which drives the gear 128, which is in turn rigidly secured to the output shaft 130. All of these gears may be provided with teeth of the type shown and described in connection with FIG. 3.

In the prior description, the electromagnetic energization circuitry has been disclosed as being independent of the position of the rotor. In FIG. 8, an alternative arrangement is disclosed wherein switches are actuated by the movement of the rotor. More specifically, as diagrammatically shown in the FIG. 8, the electromagnet 30 has been energized, shifting the magnetic cylinder 10 to the left, as shown in FIG. 1B, closing the switch 132 and thereby energizing the electromagnet 32. Incidentally, at the instant of time shown in FIG. 8, the center of the magnetic cylinder 10 is at point 142, and as the rotor 10 rolls around on the circumference of the stator, the axis follows the circle 144.

Returning to the mode of operation, when the electromagnet 32 is energized, the magnetic cylinder 10 will be drawn down toward it, and the lower periphery of the cylinder 10. will close the switch 134. This will energize the electromagnet 34, and the rotor 10 will continue its counterclockwise nutational movement.

Figure 9:
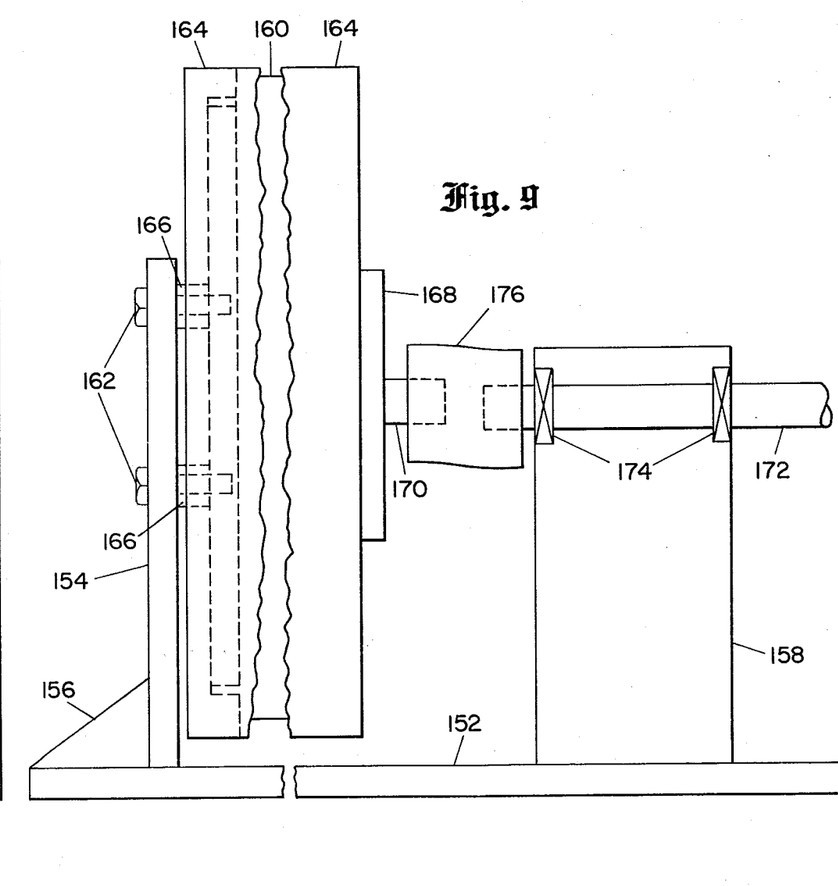
FIG. 9 is a diagrammatic showing of one mounting arrangement and flexible coupling for the motor of FIG. 1A or 7.

FIG. 9 is a schematic showing of one form of mounting and coupling arrangements which may be employed in connection with the motor of FIGS. 1-A and 7, for example. In FIG. 9 the base plate 152 has supported thereon the bracket 154 and associated bracing elements 156 at one end, and the output shaft support 158 at the other end. As shown in FIG. 9, the stator 160, which includes the electromagnets, is mounted to the bracket 154 by a set of three bolts 162. To accommodate the overhang of the magnetic cylindrical rotor 164, stand-off elements 166 are provided around the bolts 162. These stand-off elements may be in the form of thick washers, or several washers, including at least one lock washer in each set if desired. Alternatively, an adapter plate may be employed and secured between the stator 160 and bracket 154.

At the right hand end of FIG. 9 the rotor 164 is provided with an adaptor plate 168 having a central shaft 170 affixed thereto. The output shaft 172 is mounted on bearings 174 in the support 158. A flexible coupling 176 interconnects the shafts 170 and 172 to transmit the relatively slow rotation of the rotor 164 from the shaft 170 to the output shaft 172. The flexible coupling may be of any of a number of known types, including a set of sliding plates with mutually orthogonal slots, resilient materials, or bellows-type arrangements, by way of specific examples.

Figure 10:
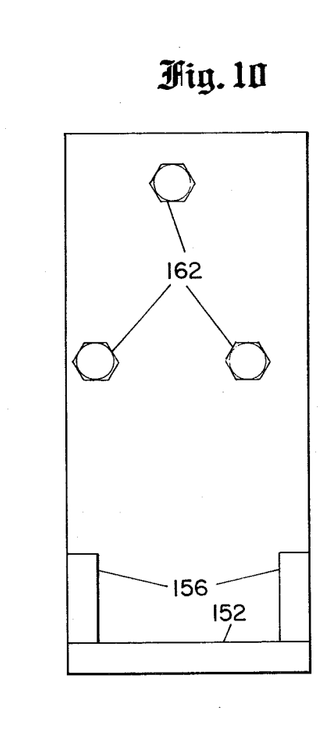
FIG. 10 shows a side view of the mountng bracket shown in FIG. 9.

FIG. 10 merely shows a side view of the breacket 154, base plate 152 and braces 156 as they would appear from the left-hand end of FIG. 9.

Now that the basic mode of operation of various embodiments of the present invention have been described, it is useful to note that the configuration of the teeth of the gears which may be employed in the implementation of the present invention are essentially such as to provide an action similar to the rolling action of one cylinder on the surface of another cylinder which is of slightly greater or lesser diameter. For example, in the case of the gears 19 and 26 of FIG. 1A, the tooth configuration will have substantially 90 degree triangular rounded teeth, and the walls of the teeth at their root will also make an angle of substantially 90 degrees with one another. Now, as one representative set of dimensions, it will be assumed that the height of the teeth will be approximately 0.030 inch, and that the width of each tooth will be approximately 0.060 inch. The root diameter of the ring gear 19 with its inwardly directed teeth, will be taken as 3.500 inches. The number of teeth will then be approximately 3.5 times 3.1516 divided by 0.06, or a little bit more than 183. Since the number of teeth must be a whole number, it will be assumed that 183 teeth will be employed, and the root diameter will then be taken as 3.495 inches. Now, after further calculation involving the necessary clearance of the internal gear 26, it has been determined that, with 178 teeth on the inner gear 26, the outer diameter is approximately 3.4595 inches, and the root diameter of this inner gear is approximately 3.3995 inches. Using these numbers, with 178 teeth on the inner gear, and 183 teeth on the outer ring gear, with each rotation or nutation or the magnetic cylinder, the cylinder will have shifted by these 5 teeth, or by about 10 degrees. This figure is arrived at by multiplying the fraction of 5 over 178 times 360 degrees in a circle.

For completeness, with regard to prior art, attention is directed to U.S. Pat. No. 3,169,201, granted Feb. 9, 1965, and entitled "Electromagnetic Harmonic Drive". The apparatus disclosed in this patent includes sixteen electromagnets spaced circumferentially around the outside of a complex laminated "flexspline" to induce the elliptical deformation of the "flexspline". The deformation serves to induce the rotation of a shaft affixed thereto by the interaction of the teeth 30 of the flexspine with the teeth 26 of a (stationary) circular spline 20. Mechanisms to induce such rotation are commonly referred to as harmonic drives, and the Spring patent discloses the use of a rotating magnetic field to produce the deformation of the flexspline 28, instead of a wave generator for harmonic drives in the form of the usual rotary cam.

On the other hand, the rotor employed in the present invention does not operate on the harmonic drive principle, requiring flexibility, but is substantially rigid, with this factor contributing strongly to the simplicity and high power capabilities of the present arrangements. In addition, by using an inner electromagnetic structure with a limited number of electromagnets, the entire structure may be made simple, compact, highly efficient, and capable of delivering high power levels. With the complex arrangements of Spring, however, the complicated moving parts and laminations will be prone to wear, require adjustments and are apparently designed for low power applications.

In closing, it is noted that calculations indicate that the motor of the present invention will be substantially more efficient for low speed operation than conventional D.C. motors. Thus, a conventional D.C. motor would normally operate at about 6,000 to 12,000 RPM and would have to be geared down, with the incidental frictional losses in the gear box. Also, the spacing between the stator and rotor of conventional motors is in the order of from 0.020 inch to about 0.1 inch. Of course, magnetic devices such as motors, operate on the inverse square law principle, so that an increased spacing means reduced force and reduced power. Also, the air resistance or "windage" losses are a significant factor, and these windage losses increase as the spacing is reduced. In the present case, however, the spacing is very small so that the magnetic flux and force is high, the speed is so low that windage losses are negligible, and there is no need for conventional gear reductions. With these various factors, it is estimated that the overall efficiency for the type of slow speed application discussed hereinabove would be in the order of 30 percent to 50 percent or more, higher than known conventional D.C. motors geared down to a comparable low speed.

Turning to other factors, it is noted that the arrangements of FIGS. 1A, 1B and FIG. 7 are to be preferred, with the electromagnets within the structure. This is a more compact and efficient geometry than the alternative arrangement of FIG. 6, for example. Also, with regard to the type of electromagnets, the two pole structures of FIGS. 1A and 1B or the E-shaped electromagnets of FIG. 7 may be used, and other alternatives providing closed magnetic paths could also be employed. With regard to the number of electromagnets, at least three are required for rotary motion through successive energization, four electromagnets are preferred for minimal capital costs with reasonably smooth operation, and up to six or eight or more may be used to obtain smoother operation at the expense of increased capital costs. It is also noted that roughened surfaces or sintering treatment of the mating surfaces of the rolling cylinder and the electromagnetic pole piece engagement circle surfaces, may be employed instead of gearing.

What is claimed is:

1. A simple, economical, low speed electric motor system comprising:
    a plurality of three or more electromagnets mounted with their pole pieces defining a cylindrical driving circle for said motor;
    a substantially rigid hollow cylindrical body of ferromagnetic material having an inner diameter slightly greater than said driving circle defined by said pole pieces;
    means for mounting said cylindrical body for rotational movement with its axis parallel to and defining a circle rotating about the axis of said driving circle;
    means for sequentially energizing said electromagnets to drive said cylindrical body around said electromagnets with said body successively engaging the pole pieces to roll around said driving circle;
    an output shaft substantially aligned with the axis of said driving circle;
    means for driving said output shaft from said rigid magnetic cylindrical body as it is actuated by said electromagnets; and
    said means for driving said output shaft from said cylindrical body including an inner gear and an outer gear with the inner gear having a lesser diameter and number of teeth than the outer gear.

2. A simple, economical, low speed electric motor system as defined in claim 1 including means for energizing said electromagnets sequentially in one direction or alternatively in the other direction to drive said output shaft in one direction or the other.

3. A simple, economical, low speed electric motor system as defined in claim 1 including means for energizing one and only one of said electromagnets to restrain said cylindrical body against rotation.

4. A simple, economical, low speed electric motor system as defined in claim 1 wherein said mounting means includes first and second pairs of gears mounted respectively at opposite ends of said cylindrical body and said electromagnets, with one gear of each pair being secured to said electromagnets and the other gear of each pair being secured to said cylindrical body, and the inner gear of each pair having a lesser number of teeth than the outer gear of each pair and the inner gear also having a substantially lesser diameter to provide gear teeth clearance as said cylindrical body rotates.

5. A simple, economical, low speed electric motor system comprising:
    a plurality of three or more electromagnets mounted with their pole pieces defining a cylindrical driving circle for said motor;
    a substantially rigid hollow cylindrical body of ferromagnetic material having an inner diameter slightly greater then said driving circle defined by said pole pieces;
    means for mounting said cylindrical body for rotational movement with its axial parallel to and defining a circle rotating about the axis of said driving circle;
    means for sequentially energizing said electromagnets to drive said cylindrical body around said electromagnets with said body successively engaging the pole pieces to roll around said driving circle;
    an output shaft substantially aligned with the axis of said driving circle;
    means for driving said output shaft from said rigid magnetic cylindrical body as it is actuated by said electromagnets; and
    said means for driving said output shaft from said cylindrical body including a flexible coupling.

6. A simple, economical, low speed electric motor system comprising:
    a plurality of three or more electromagnets mounted with their pole pieces defining a cylindrical driving circle for said motor;
    a substantially rigid cylindrical body of ferromagnetic material having a mating surface with a diameter slightly different from that of said driving circle defined by said pole pieces;
    means for mounting said cylindrical body for rotational movement with its axis parallel to and defining a circle rotating about the axis of said driving circle;
    means for sequentially energizing said electromagnets to drive said mating surface of said cylindrical body to roll around said driving circle with said body successively engaging the pole pieces of said electromagnets;
    an output shaft substantially aligned with the axis of said driving circle;
    means for driving said output shaft from said magnetic cylindrical body as it is actuated by said electromagnets; and
    said mounting means including first and second pairs of gears mounted respectively at opposite ends of said cylindrical body and said electromagnets, with one gear of each pair being secured to said electromagnets and the other gear of each pair being secured to said cylindrical body, and the inner gear of each pair having a lesser number of teeth than the outer gear of each pair and the inner gear also having a substantially lesser diameter to provide gear teeth clearance as said cylindrical body rotates.

7. A simple, economical, low speed electric motor system comprising:
   a plurality of at least three electromagnets mounted with their pole pieces defining a cylindrical driving circle for said motor;
   a substantially rigid cylindrical body of ferromagnetic material having a mating surface with a diameter slightly different from that of said driving circle defined by said pole pieces;
   means for mounting said cylindrical body for rotational movement with its axis parallel to and defining a circle rotating about the axis of said driving circle;
   means for successively energizing adjacent ones of said electromagnets to drive said mating surface of said cylindrical body to roll on said driving circle with said body successively engaging the pole pieces of said electromagnets;
   an output shaft substantially aligned with the axis of said driving circle;
   means for driving said output shaft from said magnetic cylindrical body as it is actuated by said electromagnets; and
   said means for driving said output shaft from said cylindrical body including an inner gear and an outer gear with the inner gear having a lesser diameter and number of teeth than the outer gear.

8. A simple, economical, low speed electric motor system as defined in claim 7 wherein said system includes not more than six electromagnets.

9. A simple, economical, low speed electric motor system as defined in claim 7 wherein said system includes not more than four electromagnets.

10. A simple, economical, low speed electric motor system as defined in claim 7 further comprising means for varying the rate of sequential energization of said electromagnets to vary the rate of rotation of said output shaft.

11. A simple, economical, low speed electric motor system as defined in claim 7 including means for energizing said electromagnets sequentially in one direction or alternating in the other direction to drive said output shaft in one direction or the other.

12. A simple, economical, low speed electric motor system as defined in claim 10 including means for energizing one and only one of said electromagnets to restrain said cylindrical body against rotation.

13. A simple, economical, low speed electric motor system as defined in claim 7 wherein said electromagnets are mounted outside of said driving circle.

14. A simple, economical, low speed electric motor system as defined in claim 13 wherein four electromagnets are provided.

* * * * *